United States Patent [19]

Oldford

[11] Patent Number: 4,863,202

[45] Date of Patent: Sep. 5, 1989

[54] FLUID CONNECTOR ASSEMBLY

[76] Inventor: William G. Oldford, 4944 Lakeshore Rd., Lexington, Mich. 48450

[21] Appl. No.: 97,866

[22] Filed: Sep. 16, 1987

[51] Int. Cl.[4] ............................................. F16L 39/00
[52] U.S. Cl. ................................... 285/321; 285/351; 285/353; 285/371; 285/387; 285/921
[58] Field of Search ............... 285/921, 353, 356, 321, 285/351, 387, 388, 371

[56] References Cited

U.S. PATENT DOCUMENTS

| 3,222,091 | 12/1965 | Marshall | |
|---|---|---|---|
| 3,637,239 | 1/1972 | Daniel . | |
| 3,667,785 | 6/1972 | Kapeker | 285/351 X |
| 4,105,226 | 8/1978 | Frey et al. | 265/321 X |
| 4,278,276 | 7/1981 | Ekman | 285/388 X |
| 4,431,218 | 2/1984 | Paul et al. | 285/351 X |
| 4,516,796 | 5/1965 | Hudson | 285/351 X |
| 4,565,392 | 1/1986 | Vyse . | |
| 4,615,547 | 10/1986 | Sutcliffe | 285/351 X |
| 4,690,436 | 9/1987 | Hehl . | |

FOREIGN PATENT DOCUMENTS 2155070 5/1973 Fed. Rep. of Germany ...... 285/351
91540 4/1958 Norway ............................. 285/351

Primary Examiner—Dave W. Arola
Attorney, Agent or Firm—Harness, Dickey & Pierce

[57] ABSTRACT

A fluid connector assembly is disclosed. The fluid connector assembly includes a first member having a body and a neck extending from the body. At least two peripheral grooves are formed in the neck. At least two resilient polymeric members are adapted to be received by the neck in the two peripheral grooves. A second member, having a central bore therethrough, is adapted to be received by the extending neck of the first member. The central bore has a first portion adapted to be coupled with one of the resilient polymeric members to seal the second member with the first member. A second portion of the central bore is adapted to be coupled with the other resilient polymeric member to retain the second member onto the first member.

9 Claims, 1 Drawing Sheet

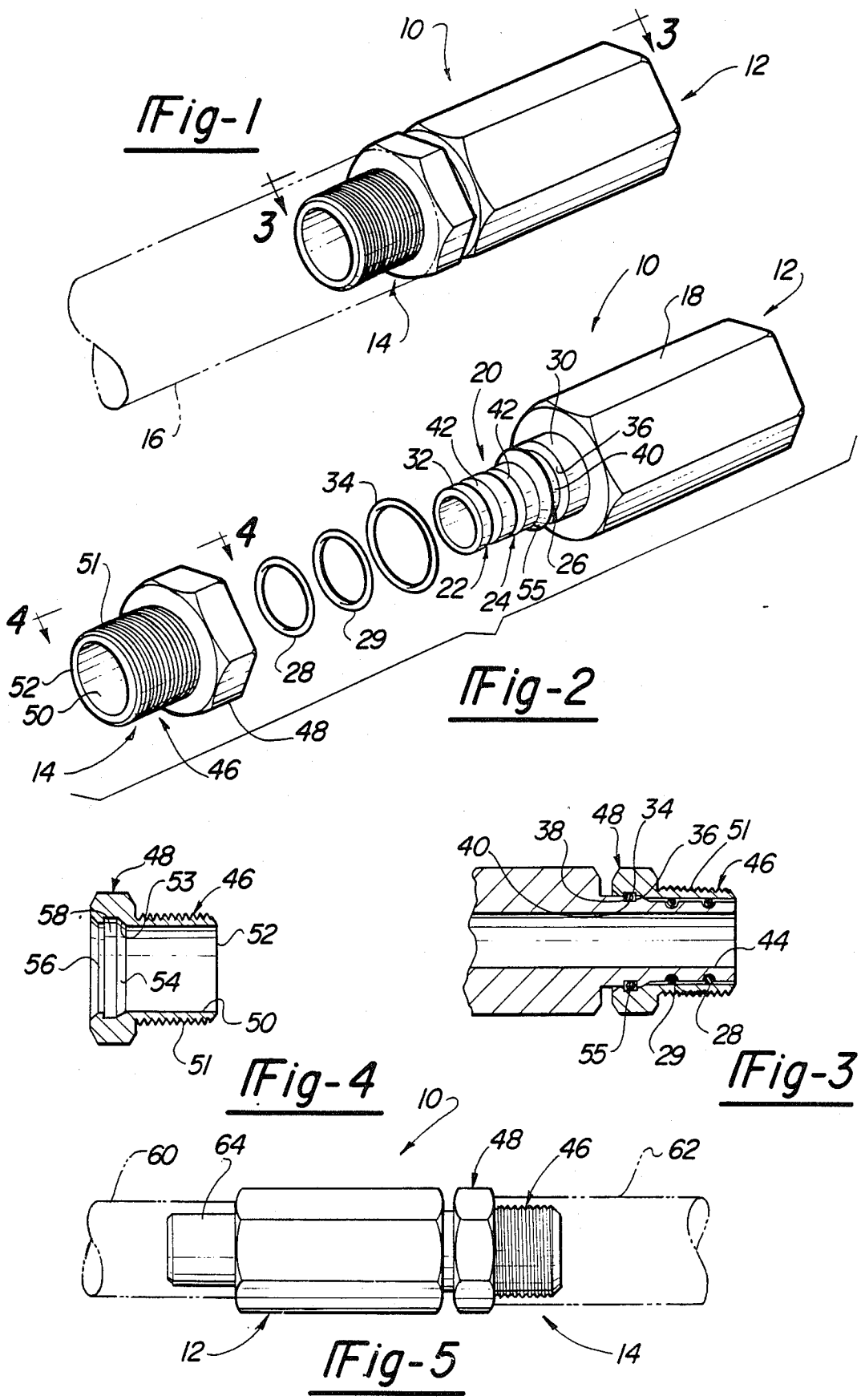

4,863,202

FLUID CONNECTOR ASSEMBLY

BACKGROUND AND SUMMARY OF THE INVENTION

The present invention relates to fluid connector assemblies for conduits and, more particularly, to connector assemblies having resilient polymeric members which seal and retain together the connector assembly.

Fluid connector assemblies are desirable to quickly couple and detach conduit assemblies or the like. Several types of connector assemblies exist in the art. These connector assemblies have various types of mechanisms to retain the connector assembly together while in use. Also, the connector assemblies utilize gaskets or the like to seal portions of the connectors while in use. Ordinarily, a connector assembly is formed of two members; a male fitting for insertion and a female fitting for receiving and securing the male fitting. Current art is illustrated in the following U.S. Patents. They are U.S. Pat. Nos. 4,690,436; 4,565,392; 3,667,785; 3,637,239 and 3,222,091.

While the above art discloses several types of connector assemblies, the art, however, has several disadvantages. One disadvantage is that the mechanism which retains the two connector members together is a slip or compression ring. While slip or compression rings are satisfactory, they require a large amount of force to couple and detach the connector members from one another.

Accordingly, it is an object of the present invention to overcome the disadvantages of the above art. The present invention provides the art with a fluid connector assembly which enables resilient polymeric members to retain and also seal the connector members with one another. The present invention enables the connector members to be easily coupled and detached from one another.

The present invention provides the art with a new and improved fluid connector assembly. The connector assembly of the present invention comprises a first member including a body portion and a neck portion extending from the body portion. At least two peripheral grooves are formed on the neck portion. At least two resilient polymeric members are adapted to be received by the neck portion in the at least two grooves. A second member having a central bore therethrough is adapted to be received by the extending neck portion. The second member's central bore has a first portion adapted to be coupled with one of the resilient members to seal the second member with the first member. A second portion of the central bore is adapted to be coupled with the other resilient member to retain the second member with the first member.

From the subsequent description taken in conjunction with the accompanying drawings, other objects and advantages of the present invention will become apparent to the skilled artisan.

BRIEF DESCRIPTION OF THE DRAWINGS

FIG. 1 is a perspective view of a connector assembly in accordance with the present invention.

FIG. 2 is an exploded perspective view of FIG. 1.

FIG. 3 is a cross-section view of FIG. 1 along line 3—3 thereof.

FIG. 4 is a cross-section view of FIG. 2 along line 4—4 thereof.

FIG. 5 is a second embodiment of a connector assembly in accordance with the present invention.

DETAILED DESCRIPTION OF THE PREFERRED EMBODIMENT

Referring to the figures, and particularly to Figures 1 and 2, a fluid connector assembly is illustrated and designated with the reference numeral 10. The fluid connector assembly 10 includes a first member 12 adapted to be coupled with a second member 14. Also, a conduit 16 may be coupled with the second member to transmit fluid or the like.

Referring to FIGS. 2 and 3, a better understanding of the first and second members 12 and 14 may be procured. The first member 12 includes a body portion 18 and an integral extending neck portion 20. The body portion 18 is elongated and has an overall hexagon cross-sectional shape. The neck 20 is cylindrical, having a plurality of grooves 22, 24 and 26 on its outer periphery.

The grooves 22 and 24 are substantially identical and are adapted to receive resilient polymeric sealing members or O-rings 28 and 29, respectively, which seal the second member 14 with the first member 12 when the members 12 and 14 are coupled together. The grooves 22 and 24 generally have a curved surface 42 to seat O-rings 28 and 29. A step portion 30 projects angularly from the neck periphery 32, increasing the diameter of the neck portion 20 adjacent to the body portion 18. The step portion 30 includes groove 26, which is adapted to receive a resilient polymeric retaining member or O-ring 34.

The groove 26 preferably has two substantially planar walls 36 and 38 which are parallel to one another and a base 40 which is substantially perpendicular to both the walls 36 and 38. The base 40 is substantially colinear with the neck periphery 32. A central bore 44 passes through the neck and body portions 20 and 18 to enable fluid to pass into the first member 12. The first member 12 may be connected with any type of structure to enable fluid passage into the structure.

The second member 14 includes a sleeve portion 46 and a flange portion 48. A central bore 50 passes through both the sleeve and flange portions 46 and 48. The sleeve 46 has an outer periphery 51 adapted to be coupled with a conduit 16 or the like, as shown in phantom in FIG. 1. The inner periphery of the sleeve 46 is defined by the central bore 50. The central bore 50 passes inward from the free extending end 52 of the sleeve portion 46 and flairs outward at the flange portion 48. The flair 53 seats against the angled portion 55 of the step portion 30. A pair of peripheral walls 54 and 56 project into the central bore 50 at the flange portion 48, as seen in FIG. 4. The projecting walls 54 and 56 define a retaining cavity 58. The retaining cavity 58 is positioned around the retaining O-ring 34, in its coupled position, to retain the second member 14 with the first member 12. The peripheral wall 56 acts as a backstop to prevent the second member 14 from sliding over retaining O-ring 34 when pressure is present in the system.

The O-rings 28, 29 and 34 are elastomeric continuous substantially circular bands of preferably a rubber material. The O-rings 28, 29 and 34 are circumferentially expanded to fit over the neck portion periphery 32 to seat into grooves 22, 24 and 26, respectively. O-ring 34 has a diameter larger than O-rings 28 and 29 to seat in groove 26 on the step portion 30. O-rings 28 and 29 seal the members 12 and 14 against leakage. O-ring 34 retains the two members in a locked relationship when in use, as seen in FIG. 3.

FIG. 5 illustrates a second embodiment of the present invention. In FIG. 5, conduits 60 and 62 are secured to the first and second members 12 and 14, respectfully. The first member 12 includes a sleeve 64 to retain the conduit 60 onto the first member 12. The central bore 44 passes through the first member 12 and sleeve 64 to enable fluid flow to pass through the conduit assembly 10. The first 12 and second members 14 are substantially identical as described herein.

While the above describes the preferred embodiment of the present invention, it will be understood that variations, modifications and alterations may be made to the present invention without deviating from the scope and fair meaning of the subjoined claims.

What is claimed is:

1. A fluid connector assembly comprising:
   a first member including a body, a neck and a step portion having a diameter less than said body, said step portion positioned between said neck and body, said neck extending from said step a desired distance and having a diameter less than said step;
   at least two peripheral grooves, one peripheral groove in said neck and one peripheral groove in said step;
   at least two resilient elastomeric substantially O-ring members having a closed peripheral surface in cross-section adapted to be received by said neck and step in said grooves, the O-ring for sealing said first member positioned on said neck to seal said first member with a second member, said second member having a central bore therethrough adapted to be received by said extending neck and step, the other of said O-rings positioned on said step for removably coupling said first member with the second member;
   said central bore of said second member having a first portion adapted to be associated with said sealing O-ring member for sealing said second member with said first member and a second portion of said central bore including a means adapted to be coupled with said other O-ring member on said step for retaining said second member on said first member.

2. The fluid connector assembly according to claim 1, said neck further comprising a third peripheral groove for receiving a third resilient polymeric member, said third resilient polymeric member further sealing said second member with said first member.

3. The fluid connector assembly according to claim 1 wherein said second member further comprises a sleeve portion having an inner periphery defining said first portion of said central bore and an outer periphery adapted to receive a conduit.

4. The fluid connector assembly according to claim 3 wherein said second member includes a flange portion adjacent said sleeve, said flange having an inner periphery defining said second portion of said central bore.

5. The fluid connector assembly according to claim 1 wherein said first member includes a central bore through said neck and into said body for passage of fluid into said first member.

6. A conduit assembly comprising:
   a conduit for transmission of fluid; and
   a connector adapted to be coupled with said conduit, said connector including:
   a first member having a body, a neck and a step portion having a diameter less than said body, said step portion positioned between said neck and body, said neck extending from said step a desired distance and having a diameter less than said step;
   at least two peripheral grooves, one peripheral groove in said neck and one peripheral groove in said step;
   at least two resilient elastomeric O-ring members having a closed peripheral surface in cross-section adapted to be received by said neck and step in said grooves;
   a second member having a sleeve portion and a flange portion with a continuous central bore through both portions defining the inner periphery of both portions, said central bore adapted to be received on said neck and step, said sleeve portion having an outer periphery adapted to be coupled with said conduit;
   said sleeve portion central bore adapted to be coupled with said resilient elastomeric O-ring member on said neck to seal said second member with said first member; and
   said flange portion central bore including a means adapted to be coupled with said other resilient elastomeric O-ring member on said step for removably retaining said second member on said first member.

7. The conduit assembly according to claim 6, said neck further comprising a third peripheral groove for receiving a third resilient elastomeric member, said third resilient elastomeric member sealing said second member with said first member.

8. The conduit assembly according to claim 6 wherein said first member includes a central bore through said neck and into said body for passage of fluid into said first member.

9. The conduit assembly according to claim 8 wherein said central bore passes through said body and said body includes means for enabling securement of a conduit to said first member.

* * * * *